United States Patent [19]

Witheford et al.

[11] Patent Number: 4,605,689
[45] Date of Patent: Aug. 12, 1986

[54] PREPARATION OF AQUEOUS POLYACRYLAMIDE SOLUTIONS FOR ENHANCED OIL RECOVERY

[75] Inventors: John M. Witheford, Wyckoff, N.J.; Joseph J. Pellon, New Canaan; William P. Colman, Stamford, both of Conn.

[73] Assignee: American Cyanamid Company, Stamford, Conn.

[21] Appl. No.: 675,491

[22] Filed: Nov. 28, 1984

[51] Int. Cl.⁴ .............................................. C08K 5/20
[52] U.S. Cl. .................................... 523/313; 523/348; 525/329.4; 525/366; 526/303.1; 526/307.6; 528/488; 528/499; 252/8.551
[58] Field of Search ............... 523/313, 318, 348; 524/555; 526/307.6, 317, 303.1; 166/275, 305 R; 252/8.55 D; 264/108; 528/488, 499, 502

[56] References Cited

U.S. PATENT DOCUMENTS

| | | | |
|---|---|---|---|
| 3,255,142 | 6/1966 | Terenzi | 523/318 |
| 4,026,932 | 5/1977 | Gross et al. | 523/313 |
| 4,113,688 | 9/1978 | Pearson | 523/318 X |
| 4,464,509 | 8/1984 | Schroeder, Jr. | 523/318 X |

Primary Examiner—Joseph L. Schofer
Assistant Examiner—Fred M. Teskin
Attorney, Agent, or Firm—Frank M. Van Riet; John W. Cornell

[57] ABSTRACT

A process is disclosed for converting polyacrylamide gel into dilute aqueous solutions suitable for use in secondary oil recovery. Polyacrylamide gel is initially converted into a slurry of small gel particles in water from which forms a homogeneous solution concentrate which is then readily diluted to give the final drive fluid without any significant polymer degradation. The process may additionally be adapted to the drilling site or to other on site operations requiring polyacrylamide solutions such as water treating, mining or paper making.

11 Claims, 4 Drawing Figures

PREPARATION OF AQUEOUS POLYACRYLAMIDE SOLUTIONS FOR ENHANCED OIL RECOVERY

FIELD OF THE INVENTION

The present invention relates to enhanced secondary or tertiary recovery of crude petroleum from underground formations. More particularly, it relates to the preparation of aqueous polyacrylamide injection drive fluids from polyacrylamide gels which may be prepared at the well site.

BACKGROUND OF THE INVENTION

Further recovery of crude oil remaining in porous subterranean formations after primary drilling and recovery operations are no longer effective is often accomplished by flooding the oil-bearing formation to force the trapped oil out of the sand or rock matrix toward a secondary recovery well. Water flooding is often employed as a secondary recovery technique, but because water readily flows through porous oil-bearing formations, significant amounts of crude oil will not be displaced. This has lead to the development of injection drive fluids, which have sufficient flowability to permeate the oil-bearing formation but have proper viscosity to displace trapped oil toward a recovery well. Several patents, including U.S. Pat. Nos. 3,476,186 (Sarem), 3,825,067 (Vestal), 3,868,997 (Pogers), 4,113,688 (Pearson), British Pat. No. 2,100,611 and British Pat. No. 2,101,179 (Marathon Oil), all of which are incorporated herein by reference, describe the preparation and use of injection drive fluids comprising water and a small amount of a water-soluble polymer, such as a polyacrylamide. Ideally, the water-soluble polymer of such an injection drive fluid will be of sufficient molecular weight to create the proper viscosity to displace the oil in an oil-bearing formation, but the polymer cannot be so high in molecular weight as to stop or clog the porous formation, and the drive fluid must be sufficiently flowable to permeate the porous formation.

Polyacrylamide gel is formed by polymerization of acrylamide monomer in aqueous solution. The polymer gel is a semi rigid rubbery material that requires further handling to convert it into the dilute aqueous polymer drive fluid. The gel must be ground or chopped into small pieces, dispersed in water and time given to allow the polymer to dissolve completely.

Prior methods have been unsatisfactory in that excessive shear or mixing degrades the polymer, lowering the polymer molecular weight and giving a solution which will be less effective for displacing trapped oil. In addition, even where excessive shear degradation is avoided, the multiple dilution steps and/or long holding times required to obtain uniform solutions without degrading the polymer makes these methods cumbersome, expensive and slow, and if the solutions are prepared at the drilling site, large storage capacities must be dedicated to solution preparation.

A process has now been discovered for converting polyacrylamide gel into aqueous polyacrylamide injection drive fluid which allows continuous on-site production at low cost of polyacrylamide drive fluids tailored to the particular subterranean formation into which they will be pumped.

The process involves making a slurry of small gel particles in water and holding the solution in a single hold tank (batch process) or a series of 3 hold tanks (continuous process) to form a homogeneous polymer solution concentrate of moderate polymer solids (0.5%–2.0%) called "polymer solution concentrate". From this "polymer solution concentrate" the final dilute (0.1–0.5% polymer solids) fluid drive solution is easily obtained by dilution with water using standard static mixer dilution procedures. This solution can be used immediately without the need of further holding or homogenizing steps. Besides reducing production time and eliminating the need for some storage equipment, the process of the present invention avoids polymer degradation, is readily adapted to the drilling site and can operate with available water, even sea water.

SUMMARY OF THE INVENTION

Accordingly, it is an object of the present invention to provide a process and apparatus for converting polyacrylamide gels into water-soluble polymer injection drive fluids for enhanced oil recovery which can be employed at the drilling site.

It is another object of the present invention to provide a process for preparing injection drive fluids which is faster, less expensive, and requires less holding time and equipment than conventional processes.

It is a further object of the present invention to provide a process for producing injection drive fluids that avoids polymer degradation, is capable of large scale operation, and provides solutions which are free of undissolved residues and gels.

It is another object of the present invention to provide a process for continuously producing solutions of polyacrylamide gel having approximately 0.1%–0.5% polymer solids for use as injection drive fluids in enhanced oil recovery, and also flocculants in water treatment and mining operations, and as paper retention aids in paper making.

It is a further object of the present invention to provide a process and apparatus for producing aqueous polyacrylamide solutions from polyacrylamide gels whose molecular weights vary over a wide range i.e., from about a few million to about 10's of millions.

It is still another object of the present invention to provide a process and apparatus for producing on-site oil well injection drive fluids with solution viscosities particularly designed for use in the sand or rock formations of the oil well site.

These and other objects are accomplished herein by a process for producing a dilute polyacrylamide solution comprising:

(a) preparing a polyacrylamide gel having about 6%–12% or greater polymer solids and a "solution viscosity"* of about 3–10 cps.

(b) pumping the polyacrylamide gel and initial dilution water (available water) through a closely spaced metal grill to form a slurry of very fine gel particles in water. The polymer solids at this point are carefully controlled to a preselected level to provide the highest level of solids (reduce storage tank size) that can give a completely homogeneous solution in the shortest time in step (c).

(c) storing the slurry for about ½ to 4 hours to obtain a uniform solution concentrate or alternatively the formation of the solution concentrate can be run in a continuous mode. In that case the residence time required for the polymer gel slurry is ¼ to 3 hours, and (d) The uniform solution concentrate is then passed through a standard static mixer with sufficient additional available water to produce a final solution having about 0.1%-0.5% polymer solids, which may be immediately used, without further holding or homogenization, as an injection drive fluid.

*Solution viscosity=viscosity of a 0.1% polymer solution in 1N NaCl measured on a Brookfield viscometer (UL, 60 rpm) at 25° C.

Alternatively in the continuous process (b) a continuous stream of gel is pumped through the metal grill having small openings along with initial dilution water to form the slurry of fine particles containing 3-30% by weight of gel and (c) the slurry is delivered to a series of 2 or 3 small hold tanks which provide ½ to 1 hour residence times in each tank so as to form a uniform homogeneous solution concentrate in the last tank and (d) the uniform solution concentrate is then passed through a standard static mixer with sufficient additional available water to produce the final solution having about 0.1-0.5% polymer solids, (depending on salinity) which may be immediately used, without further holding or homogenization as an injection drive fluid.

DETAILED DESCRIPTION OF THE INVENTION

Figure 1:
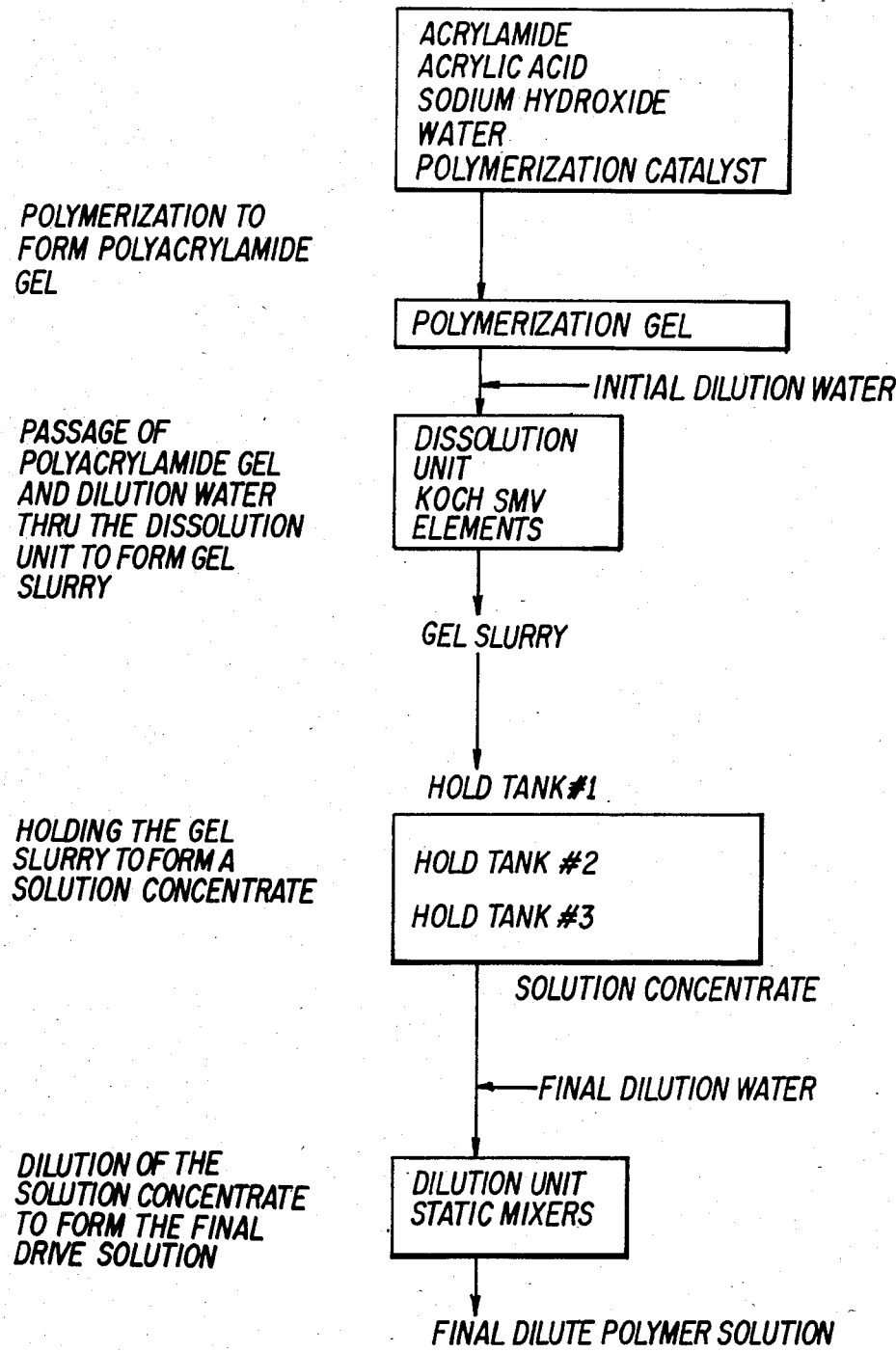
FIG. 1 is a schematic diagram of the basic process of the present invention.
Figure 2:
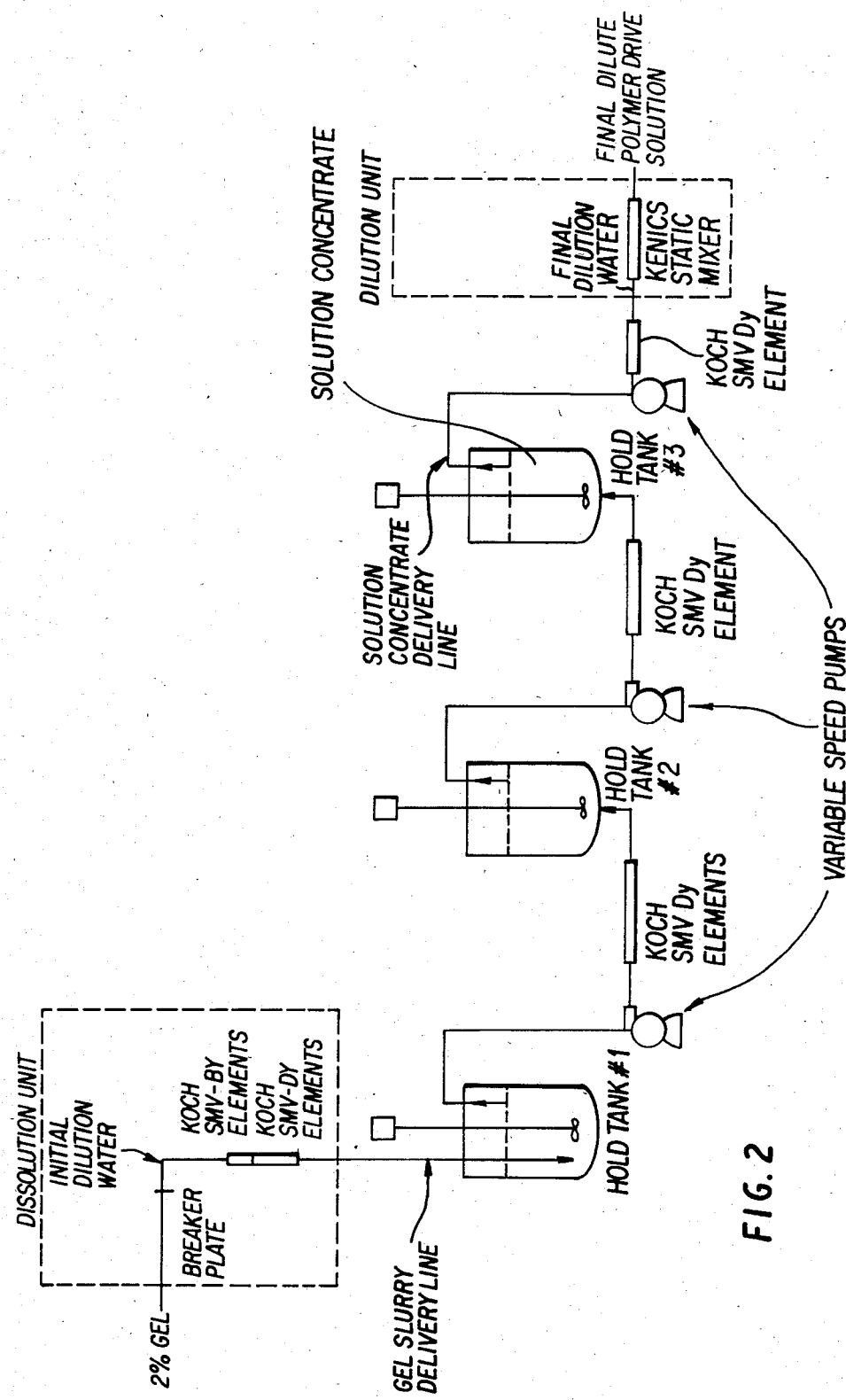
FIGS. 2 and 2A is a schematic diagram showing a preferred variation of the basic process diagram of FIG. 1.
Figure 2A:
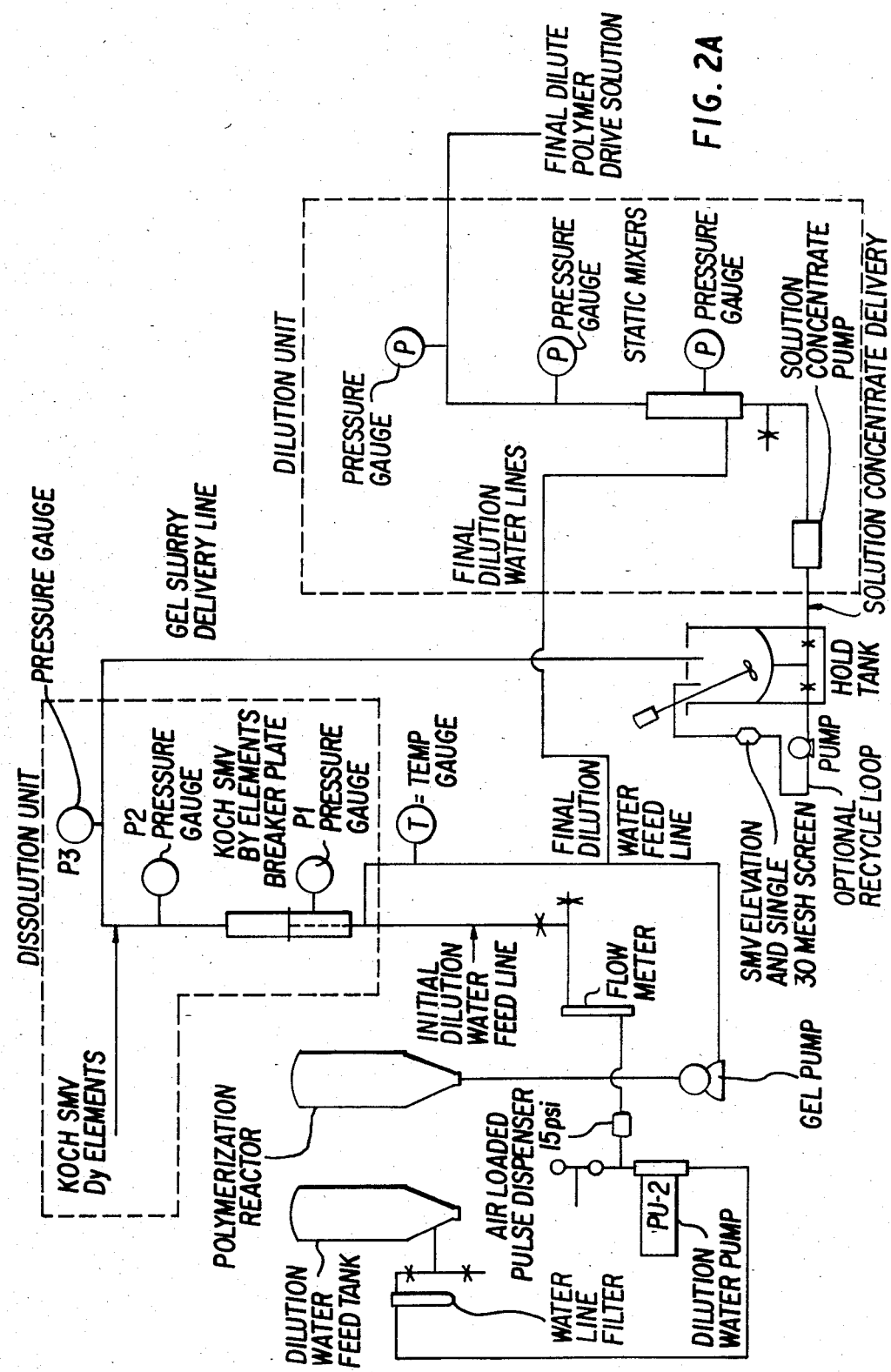
Figure 3:
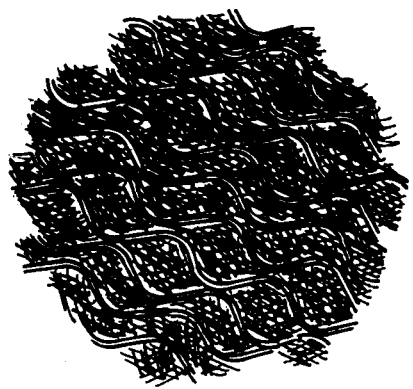
FIG. 3 is a sectional view of a Koch element suitable for use in the apparatus of the invention.

The present invention employs a polyacrylamide gel producing facility and blending equipment for dissolving the polyacrylamide gel into available on-site water to produce an injection drive fluid. The polyacrylamide gel producing facility is preferably adapted to produce an 6-15% polymer solids gel (6% for polymer on the higher range of molecular weight and 15% for polymer on the low range of molecular weight) which is then mixed with available water and passed through a series of static cutting units to provide a slurry of small size pieces of gel suspended in water (gel slurry). The water and the suspended gel pieces can either be (a) held in a hold tank and gently stirred to produce a homogeneous solution concentrate after a specified hold period (batch dissolution process) or (b) fed continuously into a series of stirred hold tanks (3) to provide sufficient total residence time to form the same solution concentrate. This procedure does not give any reduction in the molecular weight of the polyacrylamide. Thereafter, the solution is further diluted to the desired final viscosity for the particular oil-bearing formation through which it is intended to be injected.

The water-soluble polyacrylamide gels useful in the process of the present invention are commercially available and well known to persons skilled in the art. They must be fully soluble in water when further diluted from a polymer solution concentrate of about 0.5% to 2% polymer solids.* Preferred for the purpose herein are copolymers of acrylic acid and acrylamide, having the general formula,

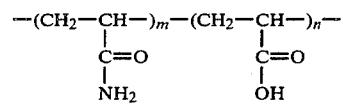

wherein m is an integer of from about 6 to about 9 and n is an integer of from about 4 to about 1.

*Lower solids are used for the higher molecular weight products and low salinities, higher solids are used for the lower molecular weight products and lower salinities.

In preferred features, the acrylamide/acrylic acid copolymer is prepared on-site according to the following recipe.

Water, acrylamide monomer and acrylic acid were charged into a reactor. The pH was adjusted to 7.5-8.0, a chelating agent and optional chain transfer agent were added. The reactor was sparged with nitrogen to reduce oxygen content and the polymerization catalyst was added. Polymerization was allowed to occur adiabatically to provide a polyacrylamide gel of 6-15% polymer solids in 10 to 24 hours. Molecular weight could be controlled to produce polymers over a wide molecular weight range corresponding to "solution viscosity" values of 3-10 cps. The ratio of acrylamide (AMD) to acrylic acid in the polymer can also be varied over a wide range, preferably from 60 to 90% AMD and 40 to 10% acrylic acid and most preferably (for enhanced oil recovery) from 75/25 AMD/acrylic acid to 65/35 AMD/acrylic acid.

Suitable polymerization catalysts include a number of water soluble redox catalysts such as ammonium persulfate, ferrous ammonium sulfate, potassium persulfate and sodium ferrous ammonium sulfate. These redox catalysts can be augmented by azo compounds such as azo bis(2-amidino propane) hydrochloride or azo bis(2,4-dimethylvaleronitrile) or azo bis 2-methylbutyronitrile.

Suitable chelating agents include EDTA (ethylene diamine tetraacetic acid) or DTPA (diethylene-triamine penta acetic acid).

Suitable chain transfer agents include propylene glycol or isopropanol or water soluble mercapto compounds.

An alternative conventional method which can be used for making the acrylamide/acrylic acid copolymer gel is to polymerize acrylamide alone in aqueous solution and then add a small amount of caustic to the gel to partially hydrolyze the polyacrylamide to form the acrylamide/acrylic acid (salt) copolymer.

The gel solution is passed through static cutting units with available water in order to provide a uniform slurry of particulate gel solids having a desired polymer solids content without substantially degrading the polymer, i.e., reducing its molecular weight. Because polymer degradation must be avoided, mechanical high shear cutting devices are unsuitable as they produce damaging shear forces. The static cutting devices contemplated consist of metal grills having openings of 1/32 to ⅜ inches across. Commercially available examples of such static cutting units are the Sulzer SMV units (Sulzer Brothers Limited, Winterthur, Switzerland) also manufactured in the United States as Koch units (Koch Engineering Company, New York City). Suitable units are the Koch SMV Dy elements with openings of ¼ inch and Koch SMV dy elements with 1/16 inch openings.

The gel slurry resulting from passage through the static units is either (a) introduced into a holding tank with gentle stirring for about 1-4 hours until the gel disappears and the polymer dissolves to give a homogeneous solution concentrate at room temperature or slightly below, e.g., 15°-20° C. or (b) the gel slurry is fed continuously into a series of 3 hold tanks with sufficient overall residence time to form the homogeneous solution concentrate in the 3rd hold tank.

The homogeneous solution concentrate can then be passed through standard static mixers with available water for final dilution to the level of polymer solids required for end use, any conventional static mixer can be used for final dilution i.e., Kenics, or Koch units of larger hole size. Because of the great reduction in solids accomplished in the dissolution stage, e.g., to a level at which the polyacrylamide is fully soluble in the available water, the solution emerges from the final dilution stage substantially free of undissolved gel and other insolubles and is ready for direct use without a final homogenization or holding step.

In order that persons skilled in the art may readily practice the process of the invention, the following examples are provided by way of illustration and not by way of limitation.

EXAMPLE 1

Acrylamide (50% American Cyanamid Company) and acrylic acid plus a small amount of propylene glycol, diethylenetriamine pentaacetic acid (DTPA) and polymerization catalyst consisting of combined ammonium persulfate, ferrous ammonium sulfate and an azo initiator were mixed in a reaction vessel along with water and copolymerized adiabatically. The resulting 12% solids copolymer gel (with acrylamide/acrylic acid ratio 74/26) had a "solution viscosity" of 7.0 cps.

The 12% solids gel was pumped through the dissolution unit consisting of 20 Koch SMVCy $\frac{3}{4}$" diameter elements with openings of 1/16 inch along with simulated fresh water (0.33% NaCl, 66 ppm CaCl$_2$) to give a gel slurry. The gel was pumped at 13 pounds/hour with a total throughput (gel and water) of 310 pounds/hour. A pressure drop of 120 to 150 pounds occurred across the Koch elements. The gel slurry as it exists from the dissolution unit consists of a mixture of gel particles ($\frac{1}{8} \times 1/16$ inch particles) suspended in the dilution water. The gel solids at this point are 6%. The product exiting from the dissolution unit was collected in a hold tank for 20 minutes (at 20° C.). The material was held for an additional 1$\frac{1}{4}$ hours in the hold tank with mild agitation. With the passage of time the gel particles swelled and gradually went into the solution after the 1$\frac{1}{4}$ hours hold time. The product became a completely homogeneous solution free of gel particles and having a polymer solids concentration of 0.5% and a bulk viscosity of 2130 cps of this "solution concentrate" was then passed through the diluting unit consisting of Koch static mixer units (20 elements $\frac{3}{4}$" SMDys) along with final dilution water (80 pounds/hour 0.5% solution and 320 pounds/hour of water) to give a 0.1% polymer solids final solution which was entirely free of gel and undissolved matter as it exited from the static mixer units. The quality of the final solution as it exited from final dilution stage was proven by passing the solution through 200 mesh screen and/1 micron filters. There was no indication of undissolved material in the solution. Also the solution viscosity of the dissolved polymer was the same as the starting polymer showing that no polymer degradation had occurred as a result of this dissolution process.

EXAMPLE 2

The following is a description of the gel dissolution process run in a batch mode with polymer on the high end of the molecular weight range and using saline water (simulated sea water) for dilution.

Acrylamide and acrylic acid were copolymerized as in Example 1 to provide a 74/26 copolymer gel at 10.5% polymer solids and having polymer solution viscosity of 8.5-9.5 cps.

Gel was pumped at 0.65 pounds/minute along with 8.30 pounds/minute of water containing 3.4% NaCl and 0.34% CaCl$_2$ through the dissolution unit to give a uniform slurry of gel particles (all less than $\frac{1}{8}$" in size) having a gel solids content of 7.3%. Pressure drops recorded were P 1, 2, 3=160-180 psi, 160-180 psi, 140-160 psi. The dissolution unit consisted of a breaker plate, 6 Koch SMV 1$\frac{1}{2}$" Dy elements, 6 Koch SMV 1" Dy elements, an 18 mesh screen and 12 half* Koch SMV Dy elements.

*A half Koch unit consists of a Koch element that has been sawed in half lengthwise—thus increasing the number of cutting processes presented to the gel.

A total of 336 pounds of the gel slurry was collected in an agitated hold tank in 41 minutes. The hold tank also included a recycle loop containing a Koch SMV 1" Dy elements and a 30 mesh screen. The contents of the hold tank were pumped continuously through the recycle loop at 8 pounds/minute. After collection the product was held in the hold tank for 3 hours which resulted in a gel free, homogeneous polymer solution concentrate of 0.76% polymer solids, bulk viscosity of 732 cps at 12 rpm. This polymer concentrate was readily converted to a dilute final solution by passage of the polymer solution concentrate and final dilution water through standard static mixer devices. The final solution was gel free, contained no insoluble material and showed no loss in molecular weight as a result of the dissolution process.

EXAMPLE 3

As in Example 2 except that the gel solids in the gel slurry were raised to 12%. This gave a polymer solution concentrate of 1% polymer solids having a bulk viscosity of 2385 cps. (12 rpm). Hold time for dissolution remained 3 hours.

EXAMPLE 4

The following is a description of the conditions used for continuous dissolution of polymer on the high end of the molecular weight range and using saline water for dilution.

Acrylamide and acrylic acid were copolymerized as in Example 1 to provide a 74/26 copolymer gel at 10.5% polymer solids and having a polymer solution viscosity of 8.5-9.5 cps.

Gel was pumped through the dissolution unit at 1 pound/minute along with water (containing 3.4% NaCl and 0.34% CaCl$_2$) at 9 pounds/minute to provide a uniform 10% gel slurry of <$\frac{1}{8}$" gel particles in water.

The dissolution unit consisted of a breaker plate, 6 Koch SMV By 1$\frac{1}{2}$" elements, 6 Koch SMV DY 1" elements, 9 half SMV Dy 1" elements and 3 screens (30 mesh).

The gel slurry exiting from the dissolution unit was fed continuously for 3 hours to a series of 3 agitated hold tanks which provided a residence time of 40 minutes for each tank. In line between each tank there were additional elements and screens i.e., between tank 1 and 2 there were two SMV Dy elements, a 40 mesh screen, and a 30 mesh screen. In line between tank 2 and 3 there were two SMV Dy elements, one 30 mesh screen and one 40–60 mesh screen. On the exit line from tank 3 there were two SMV Dy elements, one 30 mesh screen, and one 40–60 mesh screen.

The polymer solution concentrate (1% polymer solids) exiting from the third tank had a bulk viscosity of 2400 cps (12 rpm) was gel free and ready for final dilution. Polymer solution viscosity was 8.5 cps showing no significant loss in molecular weight as a result of the dilution process.

Obviously, modifications and variations of this invention are possible in light of the foregoing disclosure, however, all such changes in the disclosed embodiments are within the full intended scope of the invention as set forth in the appended claims.

We claim:

1. A process for producing a dilute polyacrylamide solution comprising:
   (a) providing a polyacrylamide gel of from about 6 to about 15% polymer solids and having a solution viscosity of from about 3 to about 10 cps, as measured on a 0.1% polymer solution in 1N NaCl in a Brookfield viscometer equipped with UL adaptor at 60 rpm and at 25° C.;
   (b) conveying the polyacrylamide gel and a minor amount of aqueous media through at least one static cutting device to provide a substantially non-degraded, concentrated aqueous slurry of finely divided gel particles;
   (c) dissolving and homogenizing said concentrated gel slurry in said aqueous media to provide a homogeneous solution concentrate; and
   (d) thereafter, diluting said solution concentrate with aqueous media until a dilute polyacrylamide solution of desired polymer solids is obtained.

2. A process as recited in claim 1, wherein in step (b), the polymer gel and aqueous medium are conveyed through a metal grill having a plurality of openings, of from about 1/32 to about ⅜ inches across to provide said slurry of gel particles.

3. A process as recited in claim 1 wherein in step (b), the polymer gel and aqueous medium are conveyed through elements having a plurality of openings of from about 1/32 to about ⅜ inches across to provide said slurry of gel particles.

4. A process as recited in claim 1, wherein in step (b), said polymer gel and aqueous media are pumped through said static cutting device at relative rates such that the gel slurry thus formed contains from about 3% to about 30% by weight of finely divided gel particles in aqueous media.

5. A process as recited in claim 1, wherein the gel slurry formed in step (b) comprises a slurry of gel particles, each having at least two dimensions of less than or equal to ⅛ inch in size.

6. A process as recited in claim 1, wherein said aqueous media comprises water or water containing salts of alkali or alkaline earth metals.

7. A process as recited in claim 1, wherein said concentrated gel slurry is dissolved and homogenized in step (c) by maintaining said gel slurry under gentle agitation for a period of from about ½ to about 4 hours to provide a homogeneous, gel-free solution concentrate.

8. A process as recited in claim 1, wherein said concentrated gel slurry is dissolved and homogenized in step (c) by continuously feeding the gel slurry through a series of holding tanks, the number of hold tanks in the series and the capacity of each tank being sufficient to provide a residence time such that a homogeneous, gel-free solution concentrate continuously exits from the last tank in the series.

9. A process as recited in claim 1, wherein the concentrated solution is diluted in step (d) by passing said solution concentrate and aqueous media through a static mixing device at a relative rate such that a dilute polyacrylamide solution having the desired level of polymer solids is obtained.

10. A process as recited in claim 1, wherein said polyacrylamide gel is provided by copolymerizing from about 60 to about 90 parts by weight of acrylamide with from about 40 to 10 parts by weight of acrylic acid in a 6 to 15% aqueous monomer solution in the presence of a polymerization catalyst, said copolymerization being performed adiabatically for a period of from about 10 to about 24 hours from a starting temperature of 20° C. to a maximum exotherm of about 90° C. until formation of said polyacrylamide gel is substantially complete.

11. A process for the preparation of a polyacrylamide injection drive fluid comprising the process recited in claim 1, wherein the concentrated gel slurry formed in step (b) contains a gel solids concentration of from about 3% to about 30%; the solution concentrate formed in step (d) contains from about 0.5 to 20% polymer solids; and the final dilute solution formed in step (d) contains from about 0.1 to about 0.5% polymer solids.

* * * * *